United States Patent [19]

Tan et al.

[11] Patent Number: 4,625,230
[45] Date of Patent: Nov. 25, 1986

[54] COLOR TELEVISION TRANSMISSION OR DATA STORAGE SYSTEM WITH TIME DIVISION MULTIPLEX ENCODING AND DATA GENERATOR AND RECEIVER SUITABLE THEREFOR

[75] Inventors: Sing L. Tan; Leendert J. van de Polder; Gerard De Haan; Franciscus W. P. Vreeswijk, all of Eindhoven, Netherlands

[73] Assignee: U.S. Philips Corporation, New York, N.Y.

[21] Appl. No.: 605,967

[22] Filed: May 1, 1984

[30] Foreign Application Priority Data

May 6, 1983 [NL] Netherlands ............... 8301600
Mar. 23, 1984 [NL] Netherlands ............... 8400926

[51] Int. Cl.$^4$ .................. H04N 11/20; H04N 11/06
[52] U.S. Cl. ............................. 358/11; 358/12; 358/13
[58] Field of Search ................... 358/13, 12, 11

[56] References Cited

U.S. PATENT DOCUMENTS 4,335,393 6/1982 Pearson .................. 358/12 X

FOREIGN PATENT DOCUMENTS

84/02442 6/1984 PCT Int'l Appl. .

OTHER PUBLICATIONS

T. S. Robson, "Extended-Definition Television Service", *IEE Proc.*, vol. 129, Pt. A, No. 7, Sep., 1982, pp. 485–492.

*Primary Examiner*—John W. Shepperd
*Assistant Examiner*—Michael P. Dunnam
*Attorney, Agent, or Firm*—Thomas A. Briody; William J. Streeter; Edward W. Goodman

[57] ABSTRACT

In a television transmission system, an encoding circuit in a data generator transmits (or stores) identification information relating to variable numbers of television lines or variable portions of television lines in which luminance and chrominance information occur, compressed where appropriate. The data receiver includes a simple, properly adaptable decoding circuit which comprises presettable counters for counting portions of television lines and for counting television lines, outputs of these counters being coupled to address inputs of a programmable memory which is coupled to a multiplexer which is switchable by the identification information and is followed by a logic circuit for generating control signals for a chrominance memory having the same write and read rates and for luminance and chrominance memories having said write rates and several read rates, under the control of a clock pulse source which is switchable via the logic circuit and the identification information. In the data generator the encoding circuit may be of a similar construction combined with luminance and chrominance memories having different write rates and the read rate mentioned in the foregoing.

11 Claims, 11 Drawing Figures

COLOR TELEVISION TRANSMISSION OR DATA STORAGE SYSTEM WITH TIME DIVISION MULTIPLEX ENCODING AND DATA GENERATOR AND RECEIVER SUITABLE THEREFOR

BACKGROUND OF THE INVENTION

The invention relates to a color television transmission or data storage system having time-division multiplex encoding, the system comprising at least one data generator, at least one data receiver and a transmission or data storage channel arranged between the generator and the receiver, the data generator comprising at least one signal source for producing signals containing luminance, chrominance, synchronizing and identification information, and an encoding circuit for the time-division multiplex encoding of at least a portion of said signals, subjected, where appropriate, to time compression, the encoding circuit having an output for supplying a time-division multiplex encoded signal for transmission via the transmission channel or storage in the data storage channel, the data receiver comprising a decoding circuit coupled to said channel, having a substantially complementary operation to that of said encoding circuit, for supplying signals containing at least luminance and chrominance information which substantially corresponds to the data produced by the signal source in the data generator; and to a data generator and data receiver suitable for use with such a transmission system.

Such a system for, more specifically, transmission is described in a published report "Experimental and Development Report 118/82", published by the U.K. "Independent Broadcasting Authority" (I.B.A.) entitled "MAC: A Television System for High-Quality Satellite Broadcasting". The Report describes several variants of so-called MAC (Multiplexed Analogue Component) picture coding. As can be seen from a Table on page 9 of the Report, it holds for all the variants that in the data generator, which is in the form of a transmitter, the luminance, and the chrominance information are each subjected to time compression, the time compression for the chrominance information being twice that for the luminance information. Of the chrominance information which comprises two components per line period, one of the two is alternately contained, in time-compressed form, in the time-division multiplex encoded signal. In this signal, the luminance information associated with each line period is present in time-compressed form. The Report mentions the factors $\frac{2}{3}$ and $\frac{3}{4}$ for the time compression of the luminance information and time compression factors equal to $\frac{1}{3}$ and $\frac{3}{8}$ for the chrominance information. The picture information per line period in the time-division multiplex encoded signal, is sequentially composed from the time-compressed luminance information and one of the two time-compressed chrominance information components associated therewith.

In the receiver, the time-division multiplex encoded signal is derived from the signal received via the transmission channel, more specifically, the satellite connection, and applied to the complementary decoding circuit which, with the aid of the synchronizing and identification information, produces a time decompression (or expansion), as the case may be, of the luminance and the chrominance information and then repeatedly supplies the decompressed chrominance information over the next line period.

In the transmission channel, which in this example, is a satellite connection, there is a limited bandwidth for the transmission of the picture data. Depending on the proposed variation, bandwidths of 8.4 MHz, 7.5 MHz and 6.0 MHz are mentioned in the Report. For the transmission channel bandwidth of 8.4 MHz, a time compression factor of $\frac{2}{3}$ is proposed for the luminance information, so that for the non-compressed luminance information, a bandwidth of 5.6 MHz is obtained. For the available picture data channel bandwidths, of 7.5 and 6.0 MHz, a luminance time compression factor of $\frac{3}{4}$ is proposed and for the bandwidths of the non-compressed luminance information, the values of 5.6 MHz and 4.5 MHz result. It has been found that for the proposed variants, with the limited transmission channel bandwidth and the proposed structure of the time-division multiplex encoded signal to be transmitted, frequency limitation for the luminance and the chrominance information are required.

In the foregoing, a transmission channel in the form of a satellite connection is mentioned by way of example. The frequency limitations required for data transmission with limited bandwidth also occur with a data storage system having a limited bandwidth. Such a storage system comprises data storage and data reproducing equipment, such as, for example, tape and record recording and reproducing devices.

SUMMARY OF THE INVENTION

The invention has for its object to provide a color television transmission or data storage system having time-division multiplex encoding where the channel, with its limited (picture transmission) bandwidth can be used optimally for picture luminance transmission or storage. Depending on the specific information content, one variant of said system variants or of further variants, still to be described hereinafter, can be used at one's option. A system according to the invention, is characterized in that in the system, the identification information comprises a plurality of information components which relate to the variable numbers of television lines or to variable portions of television lines, respectively, in which the luminance information and chrominance information is present, compressed where appropriate.

In the system according to the invention, the data generator comprises a variable encoding circuit and the data generator comprises an adaptable decoding circuit.

According to the invention, a color television system comprising a simple, well-adaptable data receiver is characterized in that in the data receiver, the decoding circuit comprises a line frequency presettable counter for counting portions of television lines, and a frame (or field-frequency) presettable counter for counting television lines, outputs of these counters being coupled to address inputs of a programmable memory, outputs of which are coupled, via a multiplexer which is switchable by the identification information received, to a logic circuit for generating start, stop, select and write (or read) signals for a memory for storing and supplying chrominance information at the same write and read rates and for memories for storing and supplying luminance or chrominance information at said write rate and one of several read rates, under the control of a clock pulse source which is switchable via the logic circuit and the identification information.

A color television system according to the invention comprising a data generator which is simple to switch, is characterized in that in the data generator the encoding circuit comprises a line frequency presettable counter for counting portions of television lines, and a frame (or field-frequency) presettable counter for counting television lines, outputs of these counters being coupled to address inputs of a programmable memory, outputs of which are coupled, via a multiplexer which is switchable by identification information to a logic circuit for generating start, stop, selection and write (or read) signals for memories for storing and supplying chrominance information, or predominantly luminance information, at the same write and read rates, and for memories for storing and supplying luminance, or chrominance, information at one of several write rates and said read rate, under the control of a clock pulse source which is switchable via the logic circuit and the identification information.

DESCRIPTION OF THE DRAWINGS

The invention will now be further described, by way of example, with reference to the accompanying drawings, in which.

DESCRIPTION OF THE PREFERRED EMBODIMENT

Figure 1:
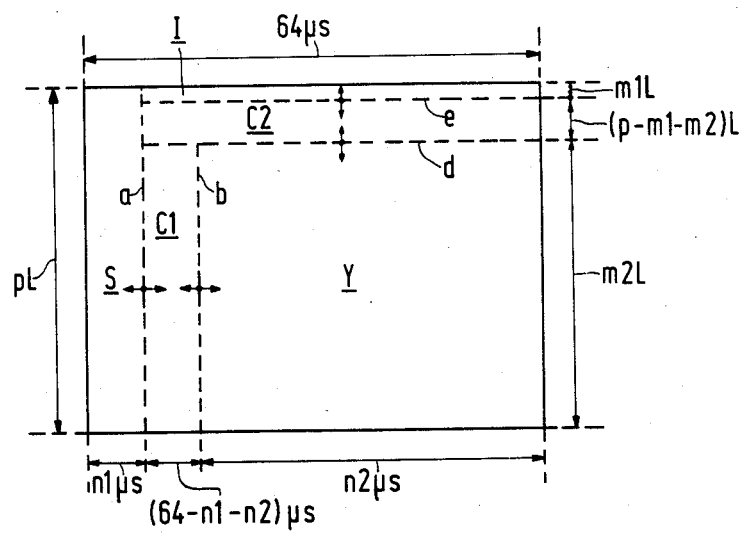
FIG. 1 illustrates, by means of a two-dimensional Figure, a possible signal structure in a color television system according to the invention.

FIG. 1 shows, schematically, the signal structure of a color television signal which occurs with a line period of, for example, substantially 64 $\mu$s and having a number pL of television lines in a field period. Examples are a number pL equal to 312.5 and 262.5 for a standardized single interlaced television system. The 64 $\mu$s line period comprises, for example, a line blanking period of 12 $\mu$s and a line scanning period of 52 $\mu$s. The field frequency may be 50 or 60 Hz. A field period then has a field blanking period of 8% of the field period. The signal having the two-dimensionally shown structure is received from a data generator which comprises a signal source for supplying signals having luminance, chrominance, synchronizing and identification information, which, in FIG. 1, are shown in some greater detail by Y, C1 and C2, S and I, respectively. The signal area denoted in FIG. 1 by S comprises line synchronizing information and, for example, sound information and/or further additional information. The I-signal area comprises field synchronizing information and, for example, additional information for, for example, teletext. In addition, identification information may occur outside the I-signal area shown in FIG. 1. The signal shown is formed in an encoding circuit for time-division multiplex encoding, time-compression being effected on the signals where appropriate. In a data receiver the signal shown is applied to a decoding circuit which fundamentally is complementary to the encoding circuit, the decoding circuit being suitable for supplying signals having at least luminance and chrominance information which substantially corresponds to the information produced by the signal source in the data generator.

In FIG. 1, dashed lines designate four border lines a, b, d and e between signal areas. The border lines a and b extend in the direction of field scan and separate portions of television lines. The above-mentioned report describes the S+C1+Y signal structure. Then, sound information may be present in a time-division multiplex code combined with synchronizing information in the S-signal area which is located in the standardized line blanking period. At the border lines a and b, it is indicated that they separate portions of the television lines having time periods of n1 $\mu$s, (64−n1−n2) and $\mu$s and n2 $\mu$s. In accordance with one embodiment of the invention, the border lines a, b, d and e are movable in the television system at one's option, which is shown in FIG. 1 by means of arrows. This renders it possible, compared with the systems (S, C1, Y) described in the above-mentioned Report, to shift the border lines a and b in dependence on the specific content of the luminance information Y and the chrominance information C1 in the encoding circuit. So as to provide that the decoding circuit adapts itself thereto, it must receive identification information. In FIG. 1, this identification information is present, by way of example, in the signal area I with, for example, the references n1 and n2. In the Figure, the signal area I comprises a number of m1L television lines, the luminance information in the signal area Y occupying m2L television lines. In the remaining number of (p−m1−m2)L television lines, the chrominance information C2 is present in the similarly designated signal area. Let it be assumed that for adapting it to the variable encoding circuit, the decoding circuit receives, as further information components, the numbers m1 and m2 in the identification information I, so that the position of the movable border lines d and e can be determined. The signal areas I and C2 are, for example, located in the standardized field blanking period, or the signal area C2 exceeds this period. It may be desirable to shift a border line to provide, on display on a display screen, a changed resolution in the direction of line scan and a changed aspect ratio.

There are mainly three possible signal structures within which the border lines a, b, d and e can be shifted at one's option.

For the first case (S, I, C1, Y) it is assumed that the border line e is located in situ of the border line d. The information component m1+m2=p is then present in the identification information I. Optionally, the information components n1 and n2 can be adjusted in the identification information I. In the decoding circuit, the signal decompression factors are derivable from the numbers n1 and n2. The decompression factor for the luminance information Y is equal to 52/n2 and for the chrominance information C1 equal to 52/64−n1−n2). The chrominance information C2 is absent and the signal area up to the border line d may correspond to the field blanking period.

For the second case (S, I, C2, Y) it is assumed that the border lines a and b coincide, so that the chrominance information C1 is absent, the information component n1+n2=64 being present in the identification information I. At n2=52 ($\mu$s) the luminance information Y is present non-compressed with the maximum bandwidth. The compressed chrominance information C2 is optionally present in the number of (p−m1−m2)L television lines, which is derivable from the numbers m1 and m2. As regards the chrominance information C2, additional identification information must be co-transmitted. Chrominance information, whether or not with the same bandwidth, may be present with the same or different compression factors in the signal area C2, more specifically, in distinct squares in the directions of line or field scan. When n2 exceeds 52, the luminance information Y is transferred or stored in the expanded form.

For the third case (S, I, C1, C2, Y) it is assumed that the border lines a, b, d and e are all present in the manner shown in the Figure. Identification of this situation follows from the relations $m1+m2 \neq p$ and $n1+n2 \neq 64$. The decompression factor for the luminance information Y follows from 52/n2, the decompression factor for the chrominance information (component) C1 follows from 52/(64−n1−n2). As regards the chrominance information (component) C2, it is again necessary to transmit additional identification information.

A preferred choice for a signal transmission (or storage) in accordance with one of the above three cases and the further choice therein of the positions of the border lines a, b, d and e, may be effected on the basis of the television-information content to be displayed. On display of a television signal derived from a large screen cine film having an aspect ratio of 5:3 or more, an adapted display at the standardized aspect ratio of 4:3 of the television picture can be used.

When also a selection feature is desired as regards processing the chrominance information every so many lines, a further identification component must be present in the identification information I.

It will be obvious that the signal areas given by way of example for the chrominance information (components) C1 and C2 can be interchanged wholly or partly with the luminance information Y, while, for example, maintaining their own area sizes for the total exchange.

In addition, the border lines a and e may be laid down in a standard so that only the border lines b and d or one of them may be shiftable at one's option. In this situation, the identification information might be absent above the border line e and present in one of the lines at the end of one out of two consecutive field periods or a multiple thereof, for example in the line 625 or 525 of the television lines, which are sequentially numbered in the picture period. For the above-described three signal structures, it then follows in a corresponding way that:

In a first case (S, C1, Y) wherein p and m1 are laid down, it holds that $m2=p-m1$. If also the number n1 is laid down, then only the number n2 needs to be transferred for the determination of the decompression factors for the luminance information Y and the chrominance information C1.

In a second case (S, C2, Y), wherein p, m1 and n1 are laid down, n2 indicates by $n2=52$ that the luminance information Y is present in a standardized unchanged manner. When n2 exceeds 52, the luminance information Y is present in the expanded form, wherein it follows for the Y-compression factor that this factor is equal to 52/n2.

In a third case (S, C1, C2, Y) wherein p, m1 and n1 are laid down and m2 and n2 are to be transferred and/or stored, the description of the third case (S, I, C1, C2, Y) described in the foregoing applies further.

For the sake of simplicity, FIG. 1 shows only four border lines a, b, d and e. A larger number of border lines is possible, in which case the picture information of, for example, two images in a time-division multiplex system can be transmitted in one field period. In addition, vertical border lines may be provided between the horizontal border lines e and d and/or the horizontal border lines may be present between the vertical border lines a and b.

Figure 2A:
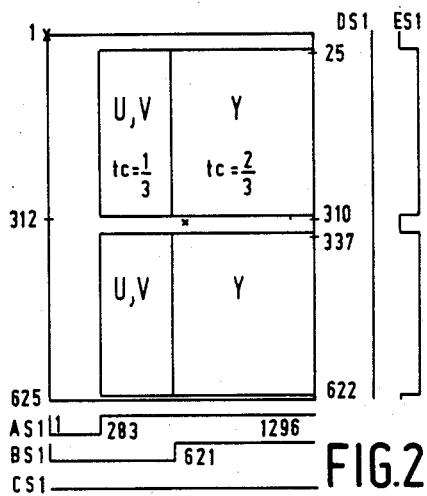
FIG. 2 shows in FIGS. 2a to 2e some variants of the signal structure and signals appropriate therefor.
Figure 2D:
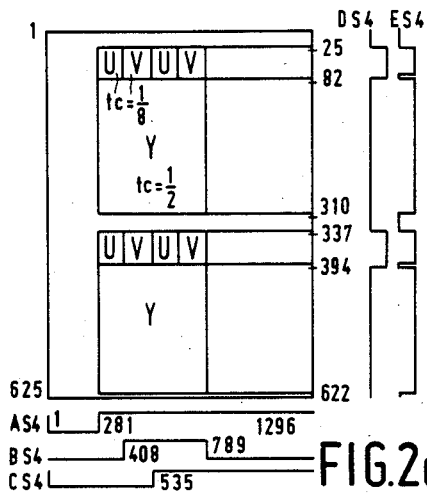
Figure 2B:
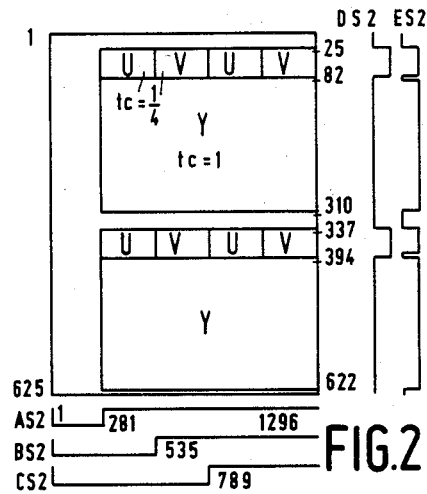
Figure 2E:
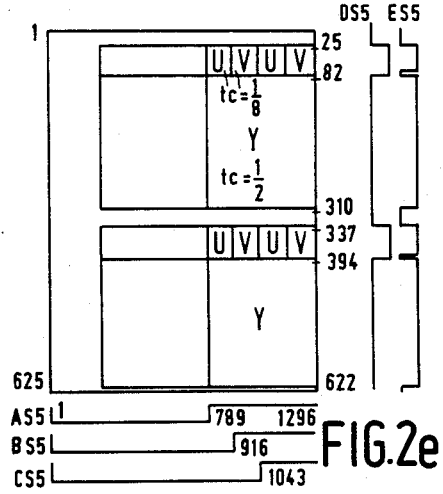
Figure 2C:
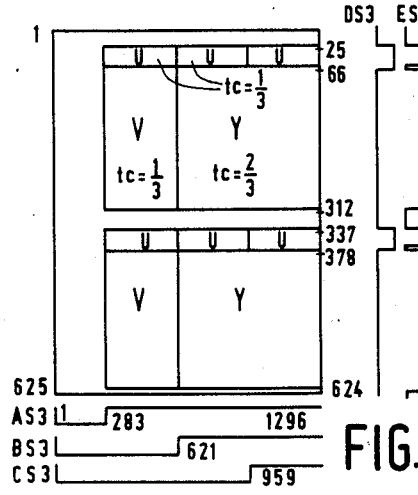
Figure 2:
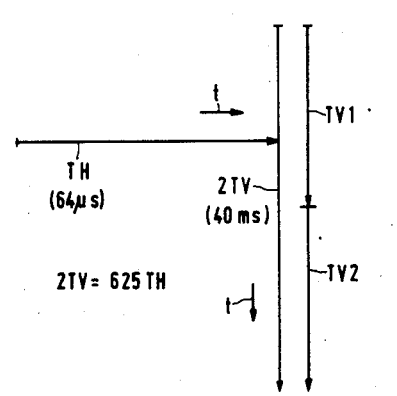

FIGS. 2a, 2b, 2c, and 2e in FIG. 2 show five examples of a possible signal structure. From top to bottom, a picture period comprising two field periods TV1 and TV2 is denoted by 2 TV along a time axis t. A line period TH is plotted along a time axis t from left to right. By way of example, it is assumed that for the frame period, it holds that 2 TV=40 ms and for the line period that TH=64 μs, 625 line periods TH being present in the frame period 2 TV. References 1 and 625 denote the television lines in the FIGS. 2a to 2e, inclusive. In FIG. 2a the positions of field synchronizing pulses are indicated by means of two crosses. In FIG. 2, signal areas having luminance information are denoted by Y, chrominance information being denoted by the information components U and V. Reference tc denotes the time compression factor belonging to a relevant signal area. In addition, at the bottom and at the right hand sides of the FIGS. 2a to 2e, some signals are shown which are denoted by AS, BS, CS and DS, ES, to which a number 1, 2, 3, 4 or 5 is added. The signals AS, BS and CS occur at the line frequency and the signals DS and ES occur at the field and frame frequency, respectively.

FIG. 2a illustrates the signal structure as described in the Report. The luminance information Y is present with the time compression factor $tc=\frac{2}{3}$ and the chrominance information components U and V are present every alternate line with the time compression factor $tc=\frac{1}{3}$. Outside these signal areas, the line blanking is present in the line period TH and twice the field blanking is present in the frame period 2 TV. In FIG. 2a, the field blanking is present from and including line 622 to line 25 and from and including line 310 to 336, respectively. The shape of the signal ES1 is associated therewith. To illustrate in greater detail the signal structure in the line periods TH throughout the frame period 2 TV, some numbers are shown next to the signals AS1 and BS1. The line periods TH are divided into 1296 line portions with the aid of a clock pulse source. Starting from the line period TH=64 μs, with the 15,625 Hz line frequency, a period of approximately 49.4 ns and a frequency equal to 20.25 MHz is obtained for the clock pulse source. The signal AS1 belongs to the line blanking which occurs from the clock pulse 1 to a clock pulse 283. It has been found that chrominance and luminance information are sequentially present from the clock pulse 283 to and including the clock pulse 1296, that is to say in 1014 clock pulse periods. As the chrominance information must be present during ⅓ part, there follows for this chrominance information 1014/3=338 clock pulse periods, which results in a signal edge in the signal BS1 at the beginning of the clock pulse 283+338=621. For the case illustrated by FIG. 2a, it follows that the signal structure is laid down in the signals AS1, BS1 and ES1, the signals CS1 and DS1 are superfluous therefor.

FIG. 2b illustrates a signal structure in which the luminance information Y is present in the non-compressed form (tc=1). The advantage thereof is the occurrence of the maximum possible bandwidth for the luminance information Y. By way of example, it is shown that the chrominance information components U and V, which are present every alternate line, are present with a time-compression factor $tc=\frac{1}{4}$ at the beginning of the field periods TV1 and TV2 in four separate signal areas U, V, U, V. By way of example, FIG. 2b shows that the chrominance information is present in the television lines from line 25 to line 82 and from line 337 to line 394. In this situation there are limits to the field blanking. The signals DS2 and ES2 shown in FIG. 2b are associated with such a signal structure. In the drawing, the signal ES2 has a pulse during the line 81 and the line 393 of the duration of one line period. Instead of the example in which there are four chrominance areas, it is possible to choose, with a larger time compression, more areas having less lines. For the signal structure considered over the line periods TH it is shown in FIG. 2b that the line blanking terminates just prior to the clock pulse 281. From the clock pulse 281 to and including the clock pulse 1296, there are 1016 clock pulse periods to be divided into four equal parts, i.e. 254 clock pulse periods. The drawing shows at the beginning of the clock pulses 535 and 789, signal edges associated with the signals BS2 and CS2. It is shown that of the four chrominance areas U, V, U, V, the starting points of only the three first chrominance areas are laid down in the signals AS2, BS2 and CS2. This is sufficient as the data for the first two chrominance areas U and V also hold for the next, second two chrominance areas U and V, which borders can now be generated internally, so that no further signals of the line frequency are required in addition to AS2, BS2 and CS2.

FIG. 2c illustrates a signal structure which is a combination of the signal structures described with reference to FIGS. 2a and 2b. The chrominance information component V is now present for each line and U for every alternate line. The component V occurs as described with reference to FIG. 2a and the component U is present in three signal areas, as was also the case for FIG. 2b. By way of example, it is shown that the component U occurs with the time-compression factor $tc = \frac{1}{3}$ from line 25 to line 66, inclusive, and from line 337 to line 378, inclusive. The signals AS3, BS3 and CS3 of the line frequency and the signals DS3 and ES3 of the field and frame frequency, respectively, are associated with the signal structure shown.

FIGS. 2d and 2e show signal structures which are identical to those of FIG. 2b, however with a twice larger time compression for the components U and V ($tc = \frac{1}{4}$), and a time compression factor $tc = \frac{1}{2}$ for the luminance factor Y. Half the signal transmission or storage capacity is used with the signal structure shown in FIG. 2d or 2e with the luminance and chrominance information YUV present in only the first or the second half of the television lines. The other half of the signal transmission or storage capacity might be used for the transmission or storage of completely different picture information but thoughts might alternatively go towards the combination of the signal structure shown in FIGS. 2d and 2e, it then being possible to realize three-dimensional television. The information of FIG. 2d is then intended for, for example, the left eye of a viewer and the information of FIG. 2e for the right eye.

As described with reference to the FIGS. 2a, 2b and 2c, the signals AS4, BS4, CS4, DS4 and ES4 belong to the signal structure shown in FIG. 2d and the signals AS5, BS5, CS5, DS5 and ES5 belonging to the signal structures shown in FIG. 2e.

FIG. 2 shows, by way of example 5 variants of the signal structure. In the data receiver identification of which variant of the signal structure is received must now be effected. Identification information can be transmitted together with the signal in the form of at least three bits. The number of variations of the signal structure can then be extended to eight. Using four bits results in an extension to sixteen possibilities for the signal structure, etc. By way of example, it is assumed that during the television line 625, three information bits are transmitted (or stored) for the identification information plus one or more check bits.

Figure 3:
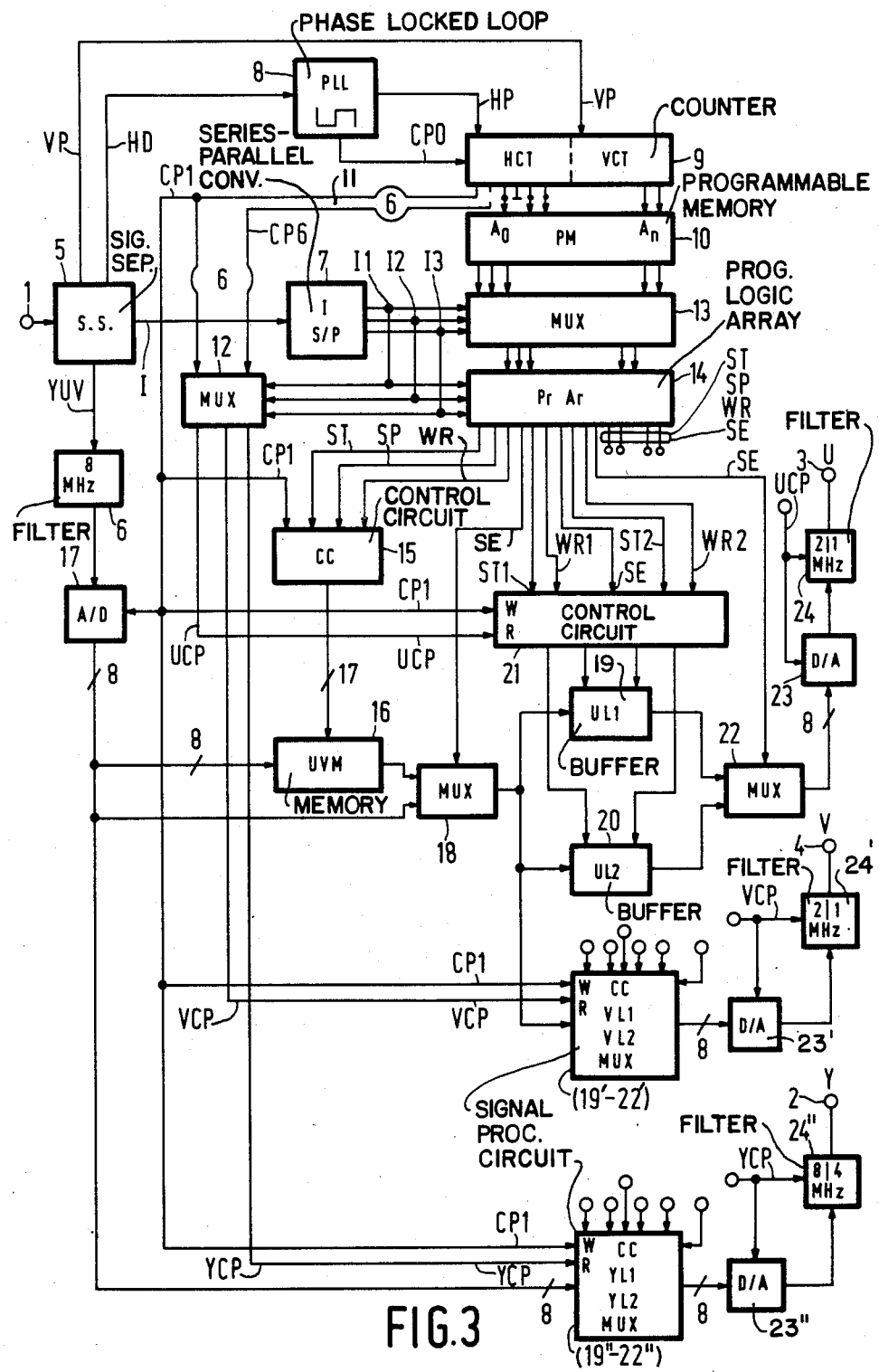
FIG. 3 is an embodiment of the decoding circuit in the data receiver.

Based on the variants of the signal structure shown by way of illustration in FIG. 2, FIG. 3 shows an adequate embodiment of a decoding circuit in a data receiver suitable for use in a color television system according to the invention. The decoding circuit shown in FIG. 3 has an input terminal 1 for connection to a transmission (or data storage) channel (not shown). The input terminal 1 is part of a data receiver, not shown, in which the decoding circuit is arranged subsequent to the terminal 1. The decoding circuit shown in FIG. 3 has three output terminals 2, 3 and 4 for supplying respective signals comprising luminance information Y and the chrominance information components U and V. The input terminal 1 is connected to an input of a signal separator (S.S.), which is denoted by reference numeral 5. In the signal separator 5, the time-division multiplex encoded signal received, which comprises luminance (Y), chrominance (U,V), synchronizing (S) and identification information (I), is divided into some signal components. The time-division multiplex signal comprising the combined luminance and chrominance information (YUV) is applied to a low-pass filter 6 having a cut-off frequency of, for example, 8 MHz. The synchronizing information (S) becomes available as a field or vertical pulse-shaped synchronizing signal VP and as a line or horizontal synchronizing information HD. The information HD may be in the form of, for example, a clock run-in signal, a code signal, a pulse-shaped synchronizing signal, etc. In addition, the signal separator 5 supplies the identification information I. The information I is received in, for example, the form of a series of bits, contained in the television line 625. For the five variants of the signal structure, described with reference to FIG. 2, it follows that at least three bits are received. The identification information I is applied by the signal separator 5 to a series-parallel converter (S/P) which is denoted by reference numeral 7. At the converter 7, it is shown that three outputs carry three identification information components I1, I2 and I3. The signal structure variants described with reference to FIG. 2 may, for example, be encoded as 000 to 100, inclusive, in the binary number system.

The horizontal synchronizing information HD is applied to an oscillator 8, which comprises a phase-locked loop (PLL). The oscillator 8 applies clock pulses CP0 with a clock pulse frequency of, for example, 40.5 MHz, to a counter arrangement 9. The counter arrangement 9 comprises a counter (HCT) for counting portions of television lines and a counter (VCT) for counting television lines. The counter (HCT) is in the form of a counter which is presettable at the line frequency, a line synchronizing pulse HP obtained from the phase-locked loop of the oscillator 8 being applied to a presetting input. The field synchronizing pulse VP obtained from the signal separator 5 is applied to a presetting input of the counter (VCT) which is presettable at the field frequency. From a more detailed description of the counter (VCT) given with reference to FIG. 4, it will become obvious that it is presettable at the frame frequency.

Outputs of the counter 9 are coupled to address inputs $A_0 \ldots A_n$ of a programmable memory PM, which is denoted by reference numeral 10. The memory 10 is, for example, in the form of a programmable read only memory (PROM) or in the form of a random access memory (RAM). The counter 9 has three further outputs which are combined with three outputs connected to the memory 10, to form a total of 6 lines, which are denoted by reference numeral 11. The lines 11 carry clock pulses denoted by CP1 to CP6, inclusive. Assuming the clock pulse CP0 to have a clock pulse frequency of 40½ MHz, as was taken by way of example hereinbefore, the following clock pulse frequencies are obtained: CP1=20¼ MHz, CP2=13½ MHz, CP3=10⅛ MHz, CP4=6¾ MHz, CP5=5 1/16 MHz and CP6=2 17/32 MHz. When expressed in a ratio, it holds for the clock pulse frequencies CP1:CP2:CP3:CP4:CP5:CP6=1:⅔:½:⅓:¼:⅛. Reference is made to FIG. 3 where these figures are mentioned as time compression factors tc.

Figure 4:
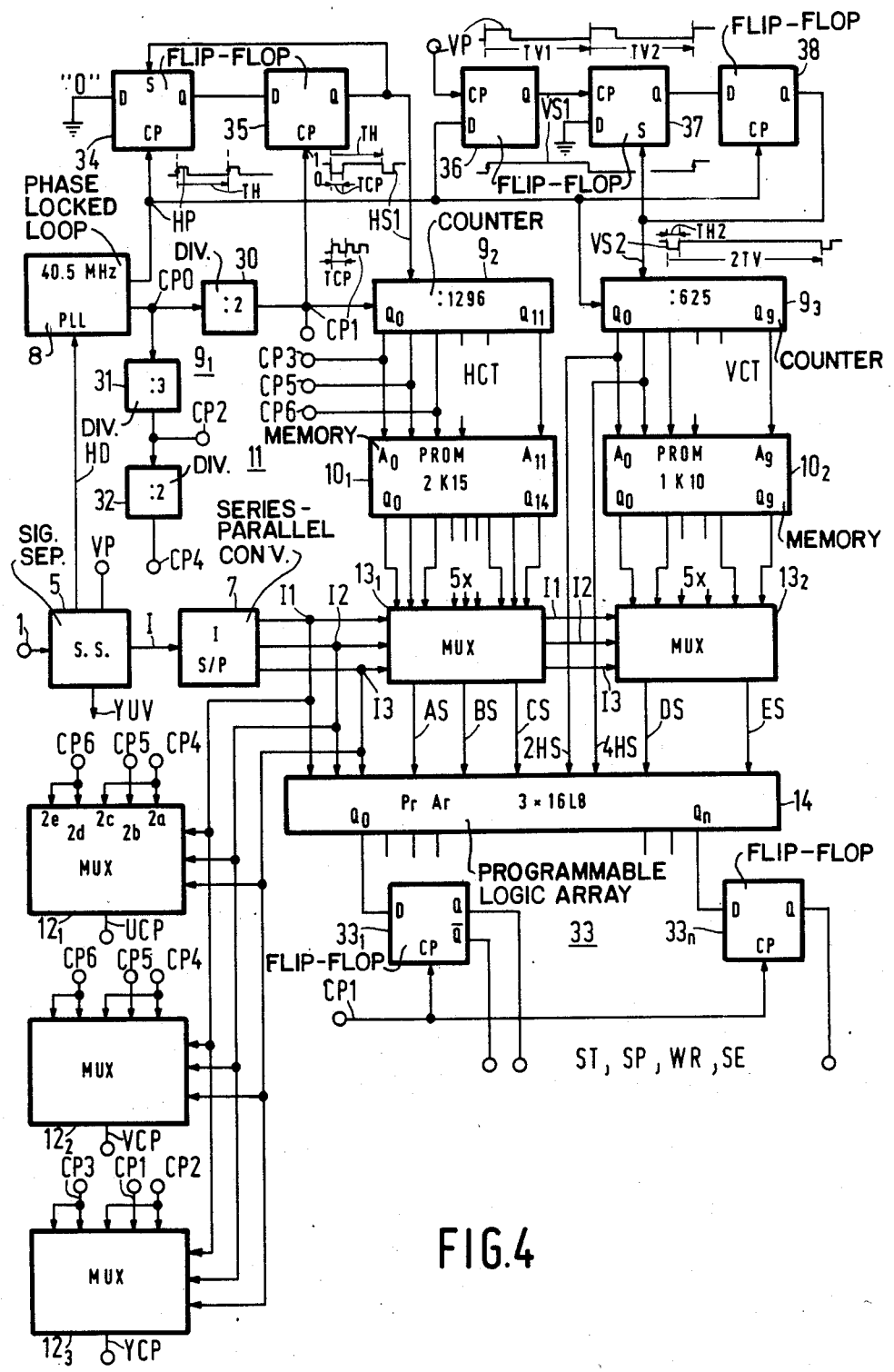
FIG. 4 shows, in greater detail, a portion of the decoding circuit shown in FIG. 3.

The 6 lines 11 are connected to inputs of a multiplexer (MUX) which is denoted by reference numeral 12 and has three control inputs to which the identification information components I1, I2 and I3 are applied. The multiplexer 12 has three outputs which, under the control of the components I1, I2 and I3, are each connectable, after having been switched, to one of the inputs. Next to the outputs of the multiplexer 12, UCP, VCP and YCP indicate clock pulses associated with reading, at different rates, of memories still further to be described. In the description of FIG. 4, the multiplexer 12 is described in greater detail.

The outputs of the programmable memory 10 are followed by a multiplexer 13, which is controlled by the identification components I1, I2 and I3. Let it be assumed that the memory 10 has five groups of five outputs each, which groups are switchable to five outputs of the multiplexer 13, depending on the components I1, I2 and I3. These outputs carry, as shown in detail in FIG. 4, the signals AS, BS, CS, DS and ES of FIG. 2, followed by one of the numbers 1 to 5, inclusive, depending on the group of outputs.

The multiplexer 13 is followed by a combinatorial logic circuit (Pr, Ar) of the "programmable logic array" type. Such a circuit, based on programmable logic, comprises a matrix which can be programmed by the user and whose inputs are connected to gates which are in connection with each other by means of OR-AND functions. FIG. 4 shows that in the example given, three logic circuits of the type 16L8 can be used, it holding that 16 represents the number of signals conveyed to the programmable matrix, L indicates the use with NOR-outputs without a register and 8 represents the number of outputs. The outputs are of the tri-state type. The logic circuit 14 is a combinatorial logic circuit, which is the simplest construction in which there are only logic functions without registers. A different, more complicated construction would comprise a programmable, read-only memory and a subsequent, parallel-in-parallel-out shift register, some outputs of which are fed-back to the memory. The construction as a combinatorial logic circuit is, from the aspect of cost, of prime importance for the decoding circuit present in the numerous data receivers.

The logic circuit 14 is used to apply start signals (ST), stop signals (SP), write-read signals (WR) and selection signals (SE) to control circuits of memories. The logic circuit 14 not only receives signals from memory 10 but also from the counter (VCT) (FIG. 4) and from the identification series-parallel converter 7.

FIG. 3 shows that outputs of the logic circuit 14, which carry a start (ST), a stop (SP) and a write-read signal (WR) are connected to a control circuit (CC) denoted by reference numeral 15 for controlling a chrominance memory (UVM) denoted by numeral 16. Only clock pulses CP1 are applied to the control circuit 15, as a result of which the memory 16 has the same write and read rates. The memory 16 may be in the form of a random-access memory having a memory content of 80k8 and 17 address lines. For the operation of the memory 16 and for memories still further to be described for storing and supplying luminance or chrominance information, it is assumed that they are used as series shift registers. The 8 parallel inputs of the memory 16 are connected to 8 parallel outputs of an analog-to-digital converter (A/D) denoted by 17 and arranged subsequent to the filter 6. The clock pulses CP1 are applied to the converter 17 for obtaining at the 8 parallel outputs with a frequency of 20¼ MHz, an 8-bit word for the instantaneous value of the luminance information Y or of one of the chrominance information components U and V. The 8 parallel outputs of the converter 17 are further connected to 8 inputs (not shown in the Figures for the sake of clarity) of a multiplexer 18, 8 parallel inputs of which are likewise connected to 8 parallel outputs of the chrominance memory 16. The multiplexer 18 has a control input to which a selection signal SE is applied from the logic circuit 14. Under the control of the selection signal SE, the 8 parallel outputs of either the chrominance memory 16 or the converter 17 are through-connected to 8 parallel outputs of the multiplexer 18. Of the variants of the signal structure shown in FIG. 2, the chrominance memory 16 is not through-connected for the structure shown in FIG. 2a. In the other cases, the memory 16 is written-in during the lines 25 to 82 or 25 to 66 (FIG. 2c) and during the lines 337 to 394 or 337 to 378 (FIG. 2c).

The 8 parallel outputs of the multiplexer 18 are followed by four line expansion (or decompression) buffer memories UL1, UL2, VL1 and VL2, the two first-mentioned memories being shown in greater detail and having been given the reference numerals 19 and 20. They will be described in still greater detail with reference to FIG. 5. The line memories 19 and 20 are controlled from a control circuit 21, multi-bit address inputs and clock pulse inputs being distinguished in the two connections shown. From the logic circuit 14 a selection signal SE for the selection of one of the memories 19 or 29 for writing or reading (WR1 or WR2) are applied to the circuit CC from a given instant (ST1 or ST2). The clock pulses CP1 are used for writing (W), while reading (R) is effected in response to the clock pulses UCP. For the clock pulse frequencies, it holds that: during writing CP1=20¼ MHz and during reading UCP=CP4=6¾ MHz for FIGS. 2a and 2c, UCP=CP5=5 1/16 MHz for FIG. 2b or UCP=CP6=2 17/32 for FIGS. 2d and 2e. The different read rates are obtained via the multiplexer 12. With respect to the higher write rate, the lower read rate produces a time expansion for the stored and supplied information, the respective time expansion factors: 3, 4 and 8 being obtained for the values given.

The line memories 19 and 20 are followed by an 8-bit multiplexer 22, which is controlled from the logic circuit 14 by a selection signal SE. The 8 parallel outputs of the multiplexer 22 are connected to 8 parallel inputs of a digital-to-analog converter (D/A) denoted by reference numeral 23. The sole output of the converter 23 is followed by a switchable low-pass filter 24, whose output is connected to the terminal 3. The clock pulses UCP are applied to the converter 23. The clock pulses UCP are shown next to the filter 24 which is switchable between 2 and 1 MHz. Let it be assumed that in the case described with reference to the FIGS. 2d and 2e with UCP=CP6=2 17/32 MHz, the 1 MHz bandwidth is present for suppressing noise components occurring during the digital-to-analog conversion. In the other cases, the higher bandwidth is present.

In FIG. 3, the components (CC, VL1, VL2, MUX) are included in one block (19'-22') for processing the chrominance component V. Also here, only the clock pulses CP1 are used for writing, while the clock pulses VCP have the different clock pulse frequencies, already described, depending on the transferred variant of the signal structure. After the digital-to-analog conversion and filtration, the expanded chrominance information component V becomes available at the output terminal 4.

Processing the luminance information Y is also effected with the aid of a block (19"-22"), the 8 parallel inputs being, however coupled directly to the outputs of the analog-to-digital converter 17. After the digital-to-analog conversion, the luminance information Y, expanded where appropriate (not according to FIG. 2b), becomes available at the output terminal 2 via a low-pass filter 24", which is switchable between 8 MHz and 4 MHz (FIGS. 2d and 2e). For time expansion, it follows that at the write-clock pulse frequency CP1=20¼ MHz and the read-clock pulse frequency YCP=CP2=13½ MHz for FIGS. 2a and 2c, YCP=CP1=20¼ MHz for FIG. 2b or YCP=CP3=10⅛ MHz for FIGS. 2d and 2d, the time expansion factors are equal to 1½, 1 and 2, respectively. At the clock pulse frequency of 10⅛ MHz the filter 24" has the bandwidth up to 4 MHz.

In the manner described a simple, adequate adaptation of the decoding circuit of FIG. 3 to the received variant of the signal structure is obtained. This simple adaptation is possible by the use of the combination of the counter HCT, which is presettable at the line frequency, the counter VCT, which is presettable at the field and frame frequency, respectively, the programmable memory 10, the multiplexer 13, the logic circuit 14, the chrominance memory 16 and the line expansion memories 19 and 20. The oscillator 8, the counter arrangement 9 (HCT), the multiplexer 12 and the control circuit 21 form a switchable clock pulse source (8, 9, 12, 21) which is controlled from the logic circuit 14 and the series-parallel converter 7. A change in the signal structure of one or more of the five variants described can be effected in a simple way by adapting the programmable memory 10 and the logic circuit 14. When a PROM memory 10 is used, a different, adaptive memory can be arranged in the circuit shown in FIG. 3. Such a replacement must always be effected at the logic circuit 14. When a RAM memory 10 is used, it can be maintained and only the content must be adapted. This is possible via a separately obtainable memory filler cassette or by means of a memory filler cassette which is filled with the changed information via the input terminal 1 outside the normally received program. When the signal structure is extended to eight variations, the multiplexer 13 described must also be extended. A further expansion of the number of variations will require an adaptation of the identification information converter 7.

As has already been described, the chrominance memory 16 is not used for receiving a signal structure as shown in FIG. 2a. It should here be noted, for the sake of completeness, that at the reception of a signal structure shown in FIG. 2b, the luminance line memories (YL1, 19) (YL2, 20) are not used for time expansion, but that they only produce a delay of one line period.

FIG. 4 shows a portion of the decoding circuit of FIG. 3 in greater detail. Components already described with reference to FIG. 3 have been given the same reference numerals, split components having been given subscripts. Thus, the counter arrangement 9 is divided into three counters $9_1$, $9_2$ and $9_3$. The counter $9_1$ comprises a divide-by-2 divider 30 and a series arrangement of a divide-by-3 divider 31 and a divide-by-2 divider 32, which, connected to the clock pulse output of the oscillator 8, produce the respective clock pulses CP1, CP2 and CP4. The counter $9_1$ applies the clock pulses CP1 to the counter $9_2$, which is in the form of a divide-by-1296 divider having 12 outputs $Q_0$ to $Q_{11}$, inclusive, and a signal HS1 of the line frequency for presetting. The counter $9_2$ is the described presettable counter HCT for counting portions of television lines, whose outputs are coupled to 12 address inputs $A_0 \ldots A_{11}$ of a programmable memory 10. The first three outputs of the counter $9_2$ supply the clock pulses CP3, CP5 and CP6. In a similar way, the counter $9_3$ operates as a divide-by-625-divider and receives the line synchronizing pulses HP by way of clock pulses and a signal VS2 of the frame frequency for presetting, and forms the counter VCP which is presettable at the frame frequency for counting television lines. Of the counter $9_3$, 10 outputs $Q_0 \ldots Q_9$ are coupled to 10 address inputs $A_0 \ldots A_9$ of a programmable memory $10_2$. The memories $10_1$ and $10_2$ are, as shown in FIG. 4, in the form of PROM's having a memory content of 2k15 and 1k10, respectively. The memory $10_1$, which has 15 outputs $Q_0 \ldots Q_{14}$, is coupled to 15 inputs of a multiplexer $13_1$, which has 3 outputs. Five groups of three inputs are always through-connected to the 3 multiplexer outputs. At the outputs of the multiplexer $13_1$, the signals AS, BS and CS are shown in the drawing, for which signals reference is made to the signals AS1, BS1, CS1; AS2, BS2, CS2, etc. of FIG. 2. Similarly, the 10 outputs $Q_0 \ldots Q_9$ of the memory $10_2$ are connected to 5 groups of 2 inputs of a multiplexer $13_2$, which has 2 outputs for supplying the signals DS and ES. In addition to the signals AS to ES, inclusive, and the identification information components I1, I2 and I3, also the signals 2HS and 4HS, having, respectively, the double and the four-fold line periods, are applied to the logic circuit 14 from the counter $9_3$. The signal 2HS serves in the logic circuit 14 for determining the cycle of two line periods for the chrominance information components U and V, which cycle is caused by the transmission, every other line, of the chrominance-information components U and V. The signal 4HS is used to determine a cycle over four line periods caused by the transmission: U, no U-information, U, no U-information, in which situation the U-information received secondly must be stored in the memory UL2. The same applies for the V-information.

For the sake of completeness, FIG. 4 shows that each of the parallel outputs $Q_o \ldots Q_n$ of the logic circuit 14 is followed by a D-flip-flop 33. The D-input of each flip-flop 33 is connected to an output of the logic circuit 14, a clock pulse CP receiving the clock pulses CP1.

Both outputs or one of the outputs of the flip-flops 33, Q and $\overline{Q}$, can be used for supplying a start signal ST, a stop signal SP, a write-read signal WR or a selection signal SE. The flip-flops 33 have for their object to provide synchronization of the signal supply.

In FIG. 4 the multiplexer 12 for supplying the different clock pulse frequencies in the read-clock pulses UCP. VCP and YCP comprise three multiplexers $12_1$, $12_2$ and $12_3$. By way of example, reference numerals $2a$, $2b$, $2c$, $2d$ and $2e$ of the multiplexer $12_1$ denote five inputs which are through-connected to the output when the variant of the signal structure of FIG. $2a$ etc. is received. The respective multiplexers $12_1$ and $12_2$ and $12_3$ shown in FIG. 4, to which the respective clock pulses CP4, CP5, CP6 and CP2, CP1, CP3 are applied, correspond to the read clock pulse frequencies mentioned in the foregoing.

In order to obtain an accurately determined counting or division, respectively, at the counters $9_2$ and $9_3$, they are in the form of resettable counters. A presetting input of the counter $9_2$ is connected to a series arrangement of two D-flip-flops 34 and 35. The flip-flop 34 receives at a clock pulse input CP, the line synchronizing pulse HP shown next to it. The D-input of the flip-flop 34 is connected to ground, which corresponds to a logic "0". The Q-output of the flip-flop 34 is connected to the D-input of the flip-flop 35, to whose clock pulse input CP, the clock pulses CP1 shown are applied. The Q-output of the flip-flop 35 carries the signal HS1, shown next to it, which is used for presetting and is further fed back to the setting input S of the flip-flop 34.

An explanation of the operation of the flip-flops 34 and 35 in the series arrangement (34, 35) and the counter $9_2$ will be based on a counting operation effected in the counter $9_2$. The logic "1" is then present in the signal HS1, as the counter $9_2$ is enabled in response to the this logic "1". Let it further be assumed that the Q-output of the flip-flop 34 carries the logic "1" and the flip-flop is rendered conductive by means of the logic "1" at the S-input. The occurrence of the ascending edge in the synchronizing pulse HP causes the flip-flop 34 to change state as the Q-output must now take over the logic "0" from the D-input. The immediately subsequent ascending edge at the clock pulses CP1 causes the flip-flop 35 to change state, as the logic "0" at the D-input is conveyed to the Q-output. The logic "0" in the signal HS1 blocks the operation of the counter $9_2$ and adjusts it to a preset zero value and, in addition, the logic "1" is applied dominantly to the Q-output of the flip-flop 34 via the S-input. The immediately subsequent ascending edge in the clock pulses CP1 causes the flip-flop 35 to change state in response to the logic "1" at the D-input as a result of which the logic "1" occurs again in the signal HS1. The counter $9_2$ is now enabled again for counting from the preset zero value. During a clock pulse period TCP shown, the logic "0" occurs in the signal HS1. After a time period (TH-TCP) the subsequent line synchronizing pulse HT occurs and the counter $9_2$ is adjusted to the preset zero value. Because of the choice of the clock pulse frequency CP1=$20\frac{1}{4}$ MHz at the line period TH=64 $\mu$, sit follows that 1296 clock pulse periods fit therein. The use of the flip-flop series arrangement (34, 35) results in an accurate counting or division, respectively.

In the preceding, the interlaced 625line standard having a frame frequency of 50 Hz was described by way of example. For the interlaced 535-line standard having a frame frequency of 60 Hz, the decoding circuit described may be of the same construction, adapted to the different time periods. For adapting the counter $9_2$ it should be noted that when the same clock period frequency CP1=$20\frac{1}{4}$ MHz is used, at the line period of 63.555 $\mu$s laid down in the standard, 1287 clock pulse periods fit therein.

The frame frequency presetting of the counter $9_3$ is realized by means of a series arrangement of three D-flipflops 36, 37 and 38, to which the field synchronizing pulse VP and the line synchronizing pulse HP, both shown in the drawing, are applied. Frame synchronization is important for those signal structures in which half the original chrominance information is transmitted. The choice can then be made whether to transmit the chrominance-information components U and V every other line or the components U of one line and the component V of the subsequent line. For both choices, it holds that for the chrominance information, a periodicity is obtained which has a cycle of four field periods, i.e. two frame periods. At a vertical picture transition in a displayed picture, color flicker phenomena occur at half the frame frequency. To prevent these phenomena, a frame-frequency synchronization must be effected. When the signal has a structure as shown in FIG. $2c$ (with six areas U and tc=1/6) the complete chrominance information can be transmitted so that synchronization at field frequency is sufficient. Instead of using three areas U with the time compression factor tc=$\frac{1}{3}$ in the signal structure, it is also possible to reduce the number of television lines by using, for example, six areas U with a time compression factor tc=1/6. The read-clock pulse frequency required therefor can be obtained by connecting a subsequent divide-by-2 divider to the divide-by-2 divider 32 of FIG. 4.

In FIG. 4 the field synchronizing pulse VP is applied to the clock pulse input CP of the flip-flop 36, to whose D-input the line synchronizing pulse HP is applied. The Q-output of the flip-flop 36 is connected to the clock pulse input CP of the flip-flop 37, whose D-input is connected to ground (logic "0") and whose Q-output is connected to the D-input of the flip-flop 38. The line synchronizing pulse HP is applied to the clock pulse input CP of the flip-flop 38, the Q-output being connected to the presetting input of the counter $9_3$ and fed-back to the setting input S of the flip-flop 37.

The mode of operation of the series arrangement (36, 37, 38) will now be explained starting from a moment at which the ascending pulse edge occurs in the pulse VP, the counter $9_3$ being enabled and operative and the logic "1" being present at the Q-outputs of the flip-flops 37 and 38. In this situation either the logic "1" (x at line 1 in FIG. $2a$) or the logic "0" (x in line 312 in FIG. $2a$) is present in the pulse HP. In FIG. 4 the result is shown at the Q-output of the flip-flop 36 with a signal VS1. The ascending pulse edge at the beginning of the field period TV1 produces a logic "0" at the Q-output of the flip-flop 37 in the first line period TH1. The next ascending line synchronizing pulse HP of the second line period TH2 causes the flip-flop 38 to change state to the logic "0", as shown in the signal VS2. The logic "0" at the S-input of the flip-flop 37 dominantly results in the logic "1" at the Q-output, in response to which the ascending pulse edge in the pulse HP at the beginning of the third time period causes the flip-flop 38 to change state again to the logic "1". In this situation, the counter $9_3$, with the preset zero value, is enabled for counting the pulses HP until the next reset-to-zero operation. The result is a frame-frequency synchronized divide-by-625 divider/- counter VCT, obtained in a simple way with the aid of the flip-flop series arrangement (36, 37, 38).

Figure 5:
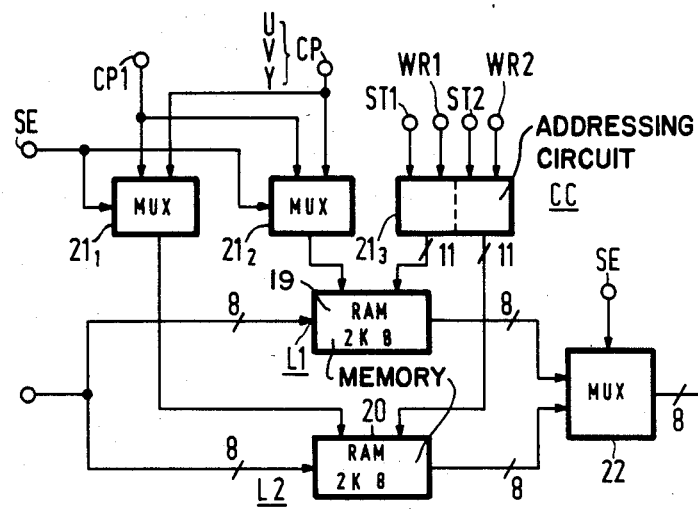
FIG. 5 also shows a more detailed portion.

FIG. 5 shows a more detailed construction of the block (19-22) comprising the line stores 19 (L1) and 20 (L2), the control circuit 21 (CC) and the multiplexer 22. The control circuit 21 is formed by two multiplexers $21_1$ and $21_2$ through which, under the control of the selection signal SE, the write clock pulses CP1 or one of the read-clock pulses UCP, VCP or YCP, as the case may be, are applied to either one or the other of the memories 19 or 20. By way of example, the stores are RAM-memories having a storage capacity of 2k8. Then, an addressing circuit $21_3$ applies from each one of 11 parallel outputs, address information to the memories 19 and 20, under the control of respective start signals ST1 and ST2 and respective write-read signals WR1 and WR2. After the information has been written rapidly into alternately, the store 19 or 20 at the high clock pulse frequency CP1, when the luminance information Y or the chrominance information component U or V to be stored is applied, the subsequent line period TH is followed by a slower reading operation, which results in time expansion. Then the line stores YL1 and YL2 are read once, whereas, the variant shown in FIG. 2c excluded, the respective line stores UL1, UL2 and VL1, VL2 are read twice successively.

For the sake of completeness, it should be noted that no stop signals SP are required for the control circuit 21 (CC), as the through-put of signals is determined by the multiplexer 22. Changes in information may then occur at those inputs which are not through-connected to the outputs.

Figure 6:
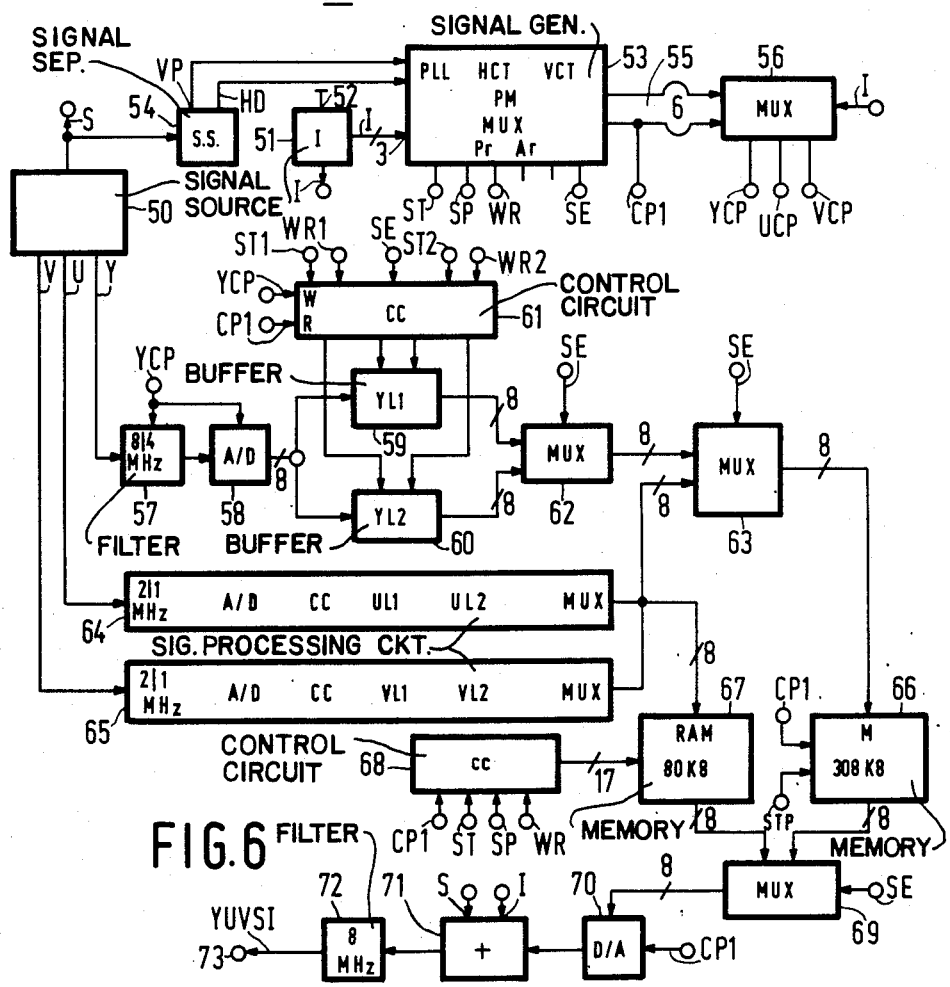
FIG. 6 is an embodiment of the encoding circuit in the data generator, portions of which are already shown in greater detail in FIGS. 3, 4 and 5.

FIG. 6 shows an embodiment of an encoding circuit in the data generator. In FIG. 6 reference numeral 50 denotes a signal source for supplying luminance information Y, chrominance information components U and V and a composite synchronizing information S. Reference numeral 51 denotes a signal source which supplies identification information I. Reference numeral 52 at the source 51 denotes a selection key by means of which it is possible to choose for which variant of the signal structure shown in FIG. 2 the encoding circuit will be operative. In the description made with reference to the decoding circuit of FIG. 3, it was disclosed how the identification information I may be present. In FIG. 6 the information I is applied via 3 lines to a signal generator 53 which, in the manner described with reference to FIGS. 3 and 4, comprises the components shown therein in FIG. 6. In addition, field synchronizing information (VP) and line synchronizing information (HD), which are separated from the information S with the aid of a signal separator 54, are further applied to the generator 53. The generator 53 supplies, via 6 lines 55 and a multiplexer 56, which is controlled by the information I, the clock pulses YCP, UCP and VCP with the different clock pulse frequencies, which are now used for writing the memories. The fixed clock pulses CP1 for reading the memories are indicated at the lines 55. The generator 53 is further assumed to supply the start signals ST, the stop signals SP, the read-write signal WR and the selection signals SE.

The luminance information Y originating from the source 50 is applied to an analog-to-digital converter 58 via a low-pass filter 57, which is switchable between 8 and 4 MHz. In the choice of the variants of the signal structure shown in FIGS. 2d and 2e, the clock pulse frequency of $10\frac{1}{8}$ MHz occurring at the clock pulses YCP, the bandwidth limited to 4 MHz is present. In addition, the converter 58 receives the clock pulses YCP. The 8 outputs of the converter 58 are connected to each one of 8 inputs of two line compression (buffer) stores 59 and 60, which are controlled from a control circuit 61. The line (buffer) stores 59 and 60 and the control circuit 61 operate as described with reference to FIGS. 3 and 5 (19, 20 and 21), however the write-and read clock pulses are interchanged. The line stores 59 and 60 are followed by a multiplexer 62, to which a selection signal SE is applied. The multiplexer 62 is connected to 8 inputs of a multiplexer 63, to which a selection signal SE is applied. Eight further inputs of the multiplexer 63 are connected to 8 outputs of each of two signal processing circuits 64 and 65 for, respectively, the chrominance information components U and V, the signal processing circuits comprising the components 57 to 62, inclusive. The switchable filters therein are adapted to the 2 MHz and the 1 MHz bandwidth.

The multiplexer 63 is followed by a field memory 66 having a memory content of 308k8. The clock pulses CP1 and a start-stop signal STP are applied to the memory 66. The memory 66 may be assumed as being from storage elements arranged in rows and columns, the rows corresponding to the television lines. The memory 66 is then operative as a shift register which is written-in line-sequentially with clock pulses CP1 in the line periods TH of the clock pulses 281 or 283 to 1296, inclusive, (FIGS. 2b or 2a and 2c), of the clock pulses 281 to 789 (FIG. 2d) or of the clock pulses 789 to 1296, inclusive, (FIG. 2e) during the period of time that only luminance information (FIGS. 2b to 2e, inclusive) or chrominance and luminance information components (FIG. 2a) are present.

The circuits 64 and 65 are followed by a chrominance memory 67 which, when in the form of a random access memory, has a storage capacity of, for example, 80k8. The memory 67 is controlled via 17 address lines from a control circuit 68 to which clock pulses CP1, a start signal ST, a stop signal SP and a write-read signal WR are applied. Eight outputs of the two memories 66 and 67 are connected to a multiplexer 69 to which a selection signal SE is applied. The multiplexer 69 has 8 outputs connected to 8 inputs of a digital-to-analog converter 70, to which the clock pulses CP1 are applied. The output of the converter 70 is connected to an input of an adder circuit 71 to which further the synchronizing information S and the identification information I are applied. The output of the adder circuit 71 is connected to an output terminal 73 of the encoding circuit of FIG. 6 via a low-pass filter 72 having a bandwidth up to 8 MHz. The output 73 carries a signal YUVSI, the luminance information Y and the chrominance information components U and V being structured, by way of example, in accordance with one of the variants shown in FIG. 2. Combining the information components S and I with the information YUV may alternatively be done in a way other than that shown in the drawing, in a signal processing operation effected at a later instant.

For the sake of completeness, it should be noted that the chrominance memory 67 is not used in the variant of the signal structure shown in FIG. 2a and that then the memory 66 is only operative with a field delay time period. Both luminance and chrominance information is then processed by the memory 66, which memory 66 however has for its main object to process only luminance information, as is the case for the variants of the signal structure of FIGS. 2b, 2c, 2d and 2e. As regards the variants shown in FIGS. 2b, 2c 2d and 2e, the luminance information Y is stored during one field period in the memory 66 and the chrominance information components U and V are stored during one field period in the memory 67, whereafter, in accordance with a time-division multiplex system the memories 67 and 66 are read sequentially via the multiplexer 69.

The encoding circuit shown in FIG. 6 and comprised in the generator 53 is, as is also the decoding circuit shown in FIG. 3, provided with a line-frequency presettable counter (HCT) for counting portions of television lines and with a frame or field-frequency presettable counter (VCT) for counting television lines, outputs of these counters being coupled to address inputs of a programmable memory (PM) inputs of which are coupled via a multiplexer (MUX) which is switchable by identification information (I) to a logic circuit (Pr, Ar) for generating start signals (ST), stop signals (SP), selection signals (SE) and write and read signals (WR). These signals are applied, at least partly, to the memories 67 and 66 for storing and supplying chrominance information or luminance information, respectively, at the same write and read rates under the control of the clock pulses CP1. In addition, there are the memories 59 and 60 or YL1, YL2; UL1, UL2 and VL1, VL2, as the case may be, for storing and supplying luminance or chrominance information, respectively, at the different write rates (clock pulses YCP, UCP and VCP) and the read rate (clock pulses CP1). To this end the encoding circuit of FIG. 6 comprises a switchable clock pulse source (PLL, HCT, 56, 61) which is controlled from the logic circuit (Pr, Ar) and the identification information source 51.

What is claimed is:

1. A data receiver for use in a color television transmission system, said transmission system using time-division-multiplex encoding and comprising at least one data generator, at least one of said data receivers, and a transmission channel arranged between said data generator and said data receiver, said data generator comprising at least one signal source for producing signals containing luminance, chrominance, sychronizing and identification information, and an encoding circuit for the time-division-multiplex encoding of at least a portion of said signals selectively subjected to time compression, said encoding circuit having an output for supplying a time-division-multiplex encoded signal for transmission over said transmission channel, said data receiver comprising a decoding circit coupled to said transmission channel having a substantially complementary operation to that of said encoding circuit for supplying signals containing at least luminance and chrominance information which substantially corresponds to the signals produced by said signal source in said data generator, wherein in said data receiver, the decoding circuit comprises a line-frequency presettable counter for counting portions of television lines, outputs of said counter being coupled to address inputs of a programmable memory, a multiplexer, switchable by said received identification information, coupled to outputs of said programmable memory, a logic circuit coupled to output of said multiplexer for generating start, stop and selection signals, write signals at a write rate, and a plurality of read signals at a respective plurality of read rates, buffer memories for storing said luminance and chrominance information under control of said write signals and for supplying said luminance and chrominance information under control of a respective one of said plurality of read signals, and a clock pulse source for controlling said buffer memories, said clock pulse source being switchable by said logic circuit and said received identification information.

2. A data receiver as claimed in claim 1, wherein the decoding circuit further comprises a counter, presettable at the field or frame frequency, for counting television lines, outputs of said counter also being coupled to address inputs of said programmable memory, and a memory for storing and supplying chrominance information at the same write and read rates, said memory being coupled to the output of said logic circuit.

3. A data receiver as claimed in claim 2, characterized in that the logic circuit is in the form of a combinatorial logic circuit.

4. A data receiver as claimed in claim 3, characterized in that inputs and outputs of the memory for storing and supplying chrominance information with the same write and read rates are coupled to inputs of a multiplexer which for its control is coupled to the logic circuit, said multiplexer being followed by the memories for storing and supplying chrominance information at the said write rate and one of several read rates.

5. A data receiver as claimed in claim 4, characterized in that said presettable counters have a presetting input to which a series arrangement of flip-flops is connected, a line synchronizing pulse being applied to this series arrangement.

6. A data receiver as claimed in claim 5, characterized in that at the field or frame-frequency presettable counter, a field synchronizing pulse is further applied to the series arrangement of flip-flops.

7. A data receiver as claimed in claim 6, characterized in that the switchable clock pulse source comprises a synchronized oscillator, the line-frequency presettable counter for counting the portions of television lines being coupled to the oscillator, a multiplexer at outputs of which clock pulses are present at different clock pulse frequencies, and memory control circuits via which the memories are controlled at said write rate and one of said plurality of read rates.

8. A data receiver as claimed in the claims 1 or 2, characterized in that the switchable clock pulse source comprises a synchronized oscillator, the line-frequency presettable counter for counting the portions of television lines being coupled to the oscillator, a multiplexer at outputs of which clock pulses are present at different clock pulse frequencies, and memory control circuits via which the memories are controlled at said write rate and one of several read rates.

9. A data receiver as claimed in claim 1, characterized in that the logic circuit is in the form of a combinatorial logic circuit.

10. A data generator for use in a color television transmission system, said transmission system using time-division-multiplexer encoding and including at least one of said data generators, at least one data receiver, and a transmission channel arranged between said data generator and said data receiver, said data generator comprising at least one signal source for producing signals containing luminance, chrominance, synchronizing and identification information, and an encoding circuit for the time-division-multiplex encoding of at least a portion of said signals selectively subjected to time compression, said encoding circuit having an output for supplying a time-division-multiplex encoded signal for transmission over said transmission channels, wherein said encoding circuit comprises a line-frequency presettable counter for counting portions of television lines, a field or frame frequency presettable counter for counting television lines, a programmable memory having address inputs coupled to outputs of said counters, a multiplexer, switchable by said identification information, coupled to outputs of said programmable memory, a logic circuit coupled to output of said multiplexer for generating start, stop and selection signals, read signals at a read rate, and a plurality of write signals at a respective plurality of write rates, memories for storing and supplying chrominance information and predominantly luminance information, respectively, at the same write and read rate, buffer memories for storing and supplying luminance and chrominance information, respectively, at a respective one of said plurality of write rates and said read rate, and a clock pulse source switchable by said logic circuit and said identification information for controlling said memories.

11. A data generator as claimed in claim 10, wherein the outputs of the buffer memories for storing and supplying luminance and chrominance information, respectively, at a respective one of said plurality of write rates and said read rates are coupled to inputs of a first multiplexer, outputs of which are coupled to inputs of said memory for storing and supplying predominantly luminance information at the same write and read rate, inputs of said memory for storing and supplying chrominance information at the same write and read rate being coupled to outputs of said buffer memories for storing and supplying chrominance information at a respective one of said plurality of write rates and said read rate, and a second multiplexer coupled to outputs of said memories for storing predominantly luminance information and chrominance information, respectively, at the same write and read rate, outputs of said second multiplexer being coupled to the encoder circuit output.

* * * * *